(12) United States Patent
Lynch et al.

(10) Patent No.: US 6,762,851 B1
(45) Date of Patent: Jul. 13, 2004

(54) METHOD AND SYSTEM FOR PRINT STREAM JOB DETERMINATION AND ANALYSIS

(75) Inventors: John P. Lynch, Yorkville, IL (US); Robert P. Williamson, Naperville, IL (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/222,745

(22) Filed: Dec. 30, 1998

(51) Int. Cl.[7] .................. G06K 15/00; G06F 13/00; G06F 3/00; G06F 13/28; B65B 35/00
(52) U.S. Cl. .................. 358/1.15; 358/1.15; 358/1.9; 358/1.18; 710/21; 710/23; 710/5; 705/1; 705/5; 705/400; 705/406
(58) Field of Search ................... 358/1.15, 1.18, 358/1.13, 1.14; 705/1, 6, 400; 710/5, 21, 23

(56) References Cited

U.S. PATENT DOCUMENTS

| | | | | |
|---|---|---|---|---|
| 4,970,554 A | | 11/1990 | Rourke | 355/202 |
| 5,270,775 A | | 12/1993 | Suzuki | 355/204 |
| 5,353,388 A | | 10/1994 | Motoyama | 395/117 |
| 5,383,129 A | | 1/1995 | Farrell | 364/464.01 |
| 5,384,620 A | | 1/1995 | Ebner et al. | 355/202 |
| 5,423,043 A | | 6/1995 | Fitzpatrick | 395/700 |
| 5,450,571 A | | 9/1995 | Rosekrans et al. | 395/500 |
| 5,467,434 A | | 11/1995 | Hower et al. | 395/114 |
| 5,475,801 A | | 12/1995 | Brindle et al. | 395/114 |
| 5,483,653 A | | 1/1996 | Furman | 395/650 |
| 5,495,561 A | | 2/1996 | Holt | 395/114 |
| 5,499,369 A | | 3/1996 | Atkinson | 395/650 |
| 5,506,661 A | | 4/1996 | Hanzawa | 355/209 |
| 5,528,734 A | | 6/1996 | Sanchez | 295/115 |
| 5,566,278 A | | 10/1996 | Patel et al. | 395/114 |
| 5,572,632 A | * | 11/1996 | Laumeyer | 395/116 |
| 5,579,087 A | * | 11/1996 | Salgado | 355/202 |
| 5,619,649 A | | 4/1997 | Kovnat et al. | 395/200.01 |
| 5,644,682 A | | 7/1997 | Weinberger et al. | 395/101 |
| 5,715,379 A | | 2/1998 | Pavlovic et al. | 395/112 |
| 5,754,830 A | | 5/1998 | Butts et al. | 395/500 |
| 5,760,775 A | | 6/1998 | Sklut et al. | 345/349 |
| 5,790,119 A | * | 8/1998 | Sklut et al. | 345/349 |
| 5,828,855 A | | 10/1998 | Walker | 395/309 |

(List continued on next page.)

Primary Examiner—Edward Coles
Assistant Examiner—Saeid Ebrahimi
(74) Attorney, Agent, or Firm—Ronald Reichman; Paul A. Levitsky; Angelo N. Chaclas

(57) ABSTRACT

The invention is a method and system for print stream determination. The system's method begins with the initiation of a print stream processing application to which a print stream is directed. A print job is determined from a set of characteristics resident in the print stream. The print processing application will determine the optimal use of the system's peripheral devices for performing the job. The optimal use is determined by comparing each of the job's characteristics with each of the characteristics of the potential device driver. The comparison begins with determination of a value for each of the job characteristics wherein the value is representative of a desired result. A value for each of the device driver characteristics is determined wherein the value is representative of a potential result. Each of the desired results is compared to each corresponding potential result. If no corresponding potential result can be established, then an alternative peripheral device is sought. If no peripheral device is located, then the application will select a default peripheral device. The print stream will then be directed to the selected device for processing. Once the print stream has been analyzed, and the use of peripheral devices determined, the application establishes a job ticket representative of the print job and the optimal use of the one or more corresponding peripheral devices. The system can then produce one or more reports indicative of the job performance.

27 Claims, 12 Drawing Sheets

U.S. PATENT DOCUMENTS

| | | | |
|---|---|---|---|
| 5,974,443 A | 10/1999 | Jeske | 709/202 |
| 5,978,560 A * | 11/1999 | Tan et al. | 395/114 |
| 6,031,623 A | 2/2000 | Smith et al. | 358/1.14 |
| 6,173,295 B1 | 1/2001 | Goertz et al. | 707/505 |
| RE37,258 E | 7/2001 | Patel et al. | 358/1.15 |
| 6,370,521 B1 * | 4/2002 | Pigos et al. | 707/2 |

* cited by examiner

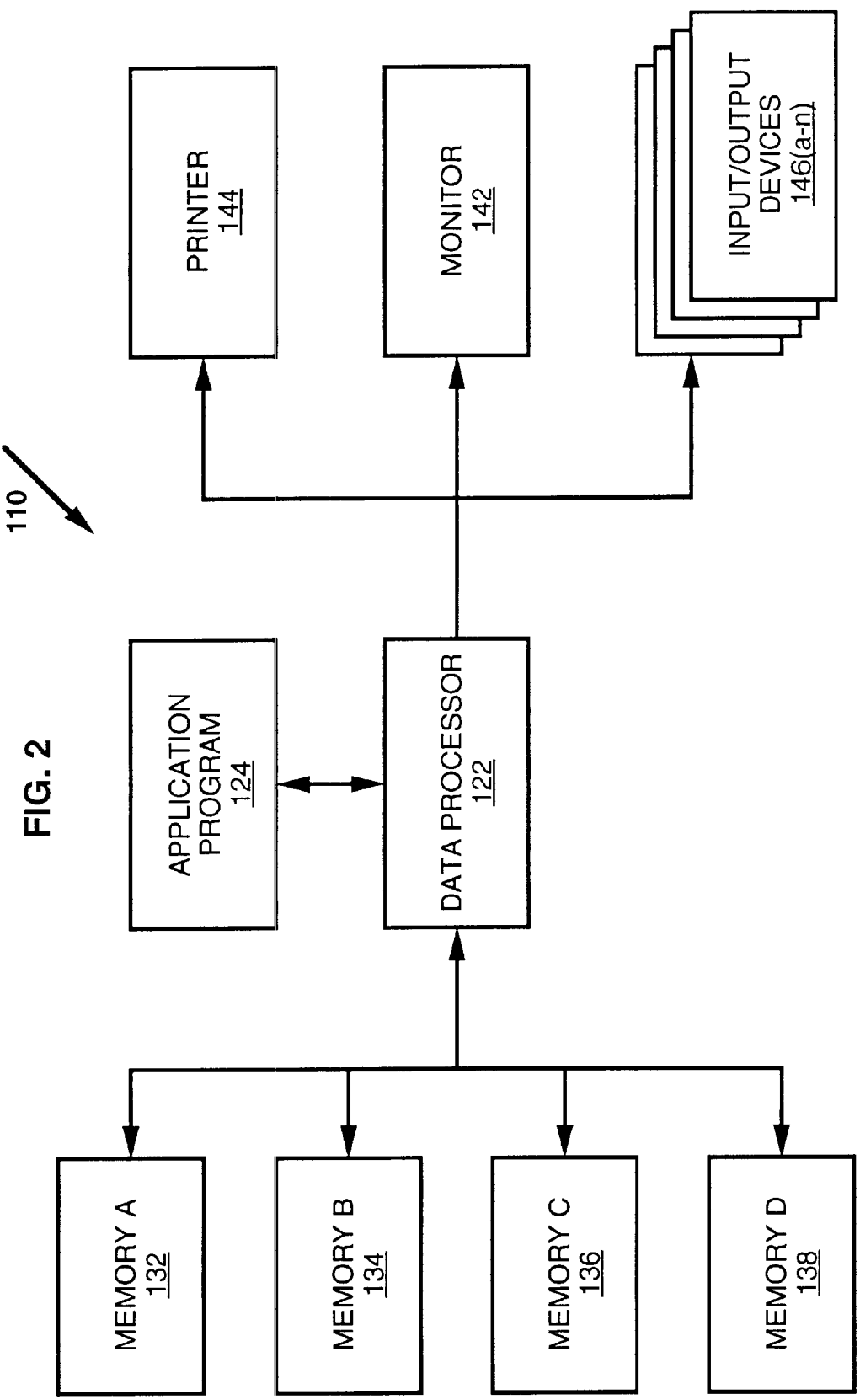

METHOD AND SYSTEM FOR PRINT STREAM JOB DETERMINATION AND ANALYSIS

RELATED APPLICATIONS

Reference is made to application Ser. No. 09/222,640, entitled A METHOD AND SYSTEM OF DETERMINING A JOB TICKET FOR A PRINT STREAM DETERMINING PROCESS, assigned to the assignee of this application and filed on even date herewith.

Reference is made to application Ser. No. 09/223,348, entitled MESSAGE STRUCTURE FOR A PRINT STREAM DETERMINING AND ANALYSIS SYSTEM, assigned to the assignee of this application and filed on even date herewith.

Reference is made to U.S. Pat. No. 6,433,881, entitled A METHOD OF ESTABLISHING A SET OF PRINT STREAM OBJECTS IN AN OBJECT ORIENTED Environment, assigned to the assignee of this application and filed on even date herewith.

FIELD OF THE INVENTION

The general field of the invention is that of data processing, and, more specifically, print stream processing. In its most specific segmentation, the field is that of optimization of those devices directed to processing a print stream for the purpose of producing a plurality of mailpieces.

BACKGROUND OF THE INVENTION

In the past several years, significant changes have occurred in the operation of high volume document production centers. These centers have merged traditional printing capabilities with mailroom production facilities. Executives tasked with the management of both print and mail operations are expected to play an ever-growing role in the creation and design of document centers that will deliver effective, high quality, and high integrity output. The current development and emphasis on these centers in corporations or regional centers has lead to the growing use of the term "Automated Document Factory" (hereinafter "ADF") to describe consolidated printing and mail finishing operations.

In current practice, large mailing companies tend to separate the process of creating documents from the process of manufacturing documents (mailpieces). The print center tasked with finishing the created document receives both scheduled and scheduled print jobs with a wide range of requirements. These print jobs are evaluated, scheduled, and executed in the print/finish center.

Because the print/finish center has traditionally been "information systems poor," most of the work required to prepare or "condition" the print job for manufacturing was created in the business unit or print service client. Typical conditioning processes include: performing postal address hygiene; adding PostNet™ barcodes; presorting mailings; adding inserter barcode instructions; adjusting printer paper size and orientation; and, adding spot color instructions.

The manager of such a print/finish operation, seeking to maximize efficiency through optimal use of equipment and decision making tools, is faced with a dilemma. First, the decisions about the structure and management of the print/finish center are generally made outside of the center; the decisions are generally made by the Information Systems (IS) group creating the print job and its associated print stream. Document manufacturing requests are also assigned lower priorities, further limiting management control. Second, the hardware systems and their associated peripheral devices are often sourced from different manufacturers so that the printers and inserters being fed by the print stream are relying on differing motivators from the print stream.

To help classify and organize the concept of the emerging print/finish center, an architecture has been developed within the print stream industry that is referred to as the ADF. The Automated Document Factory™ architecture proposed by the Gartner Group of Stamford, Conn., provides a model for a set of processes that prepares and positions enterprises to manage the creation and delivery of high-volume digitized documents by using factory production techniques that appropriately and optimally mechanize document production. The raw materials of production (i.e., the document data and preparation instructions), enter the ADF which transforms them into digital documents and prepares them for delivery.

The architecture for the ADF is comprised of four (4) modules; these include: input; transformation; delivery and preparation; and, control and reporting. Each module, or building block, is made up of other modules and each is connected by a series of interfaces, or links.

Each of the building blocks must be linked through effective communication which includes the tracking and measurement of the input and output of the document manufacturing hardware and associated peripherals. To enhance productivity and costeffectiveness of the overall system, systems managers need to be able to scrutinize every element of the print job process to see where improvements can be made. Thus, each of the modules takes on an increased significance when viewed with respect to their relationship with the overall system.

There is thus a need to provide each of the modules for the ADF so that the structure can be self supporting and viable. The input module is where all of the data and instructions needed to transform the arriving print stream data into documents enters the ADF. The present invention is currently being introduced to the print stream market by the assignee of the present invention, Pitney Bowes Inc. of Stamford, Conn., as the InStream™ server which is designed as the input module for the ADF.

It is an object of the present invention to provide the input module to the conceptual ADF frame by describing herein an open systems, client-server technology for facilitating automated document manufacturing techniques.

It is a further object of the present invention to provide a method of optimizing the use of hardware and associated peripheral devices in manufacturing documents that have been digitally delivered through the input module. Additionally, it is further object of the present invention to measure the activities of each of the hardware and peripheral components so that accurate reporting can be made so as to facilitate subsequent job performance decisions and so as to maximize system utility and performance.

SUMMARY OF THE INVENTION

According to the invention, the above objects are achieved and the disadvantages of the prior art are overcome by a method and system for print stream determination wherein the print stream is directed to a print processing application for determining a job to be performed by a print processing system. The preferred embodiment of the system will include peripheral devices for producing mailpieces from the print stream as determined by job tickets established by the print processing application.

The system's method begins with the initiation of a print stream processing application to which a print stream is directed. The print stream is initiated at any one of a number of print service clients which would include: print servers; digital document delivery; and, finishing equipment. A print job is determined from a set of characteristics resident in the print stream; these characteristics might include: document text; mailpiece definition; volume; and, routing instructions for routing the print stream to a corresponding peripheral device driver of a corresponding peripheral device; and, elements for determining device driver definition elements for defining characteristics and capabilities of each of the corresponding peripheral devices.

The optimal use determination is made by comparing each of the job definition elements with each of the device driver definition elements. The comparison of the job definition elements with each of the device driver definition elements further comprises a number of steps which begins with determination of a range or a value for each of the job definition elements wherein the range or the value is representative of a desired result. A range or a value for each of the device driver definition elements is determined wherein the range or value is representative of a potential result. Each of the ranges or values for the device driver definition elements is compared to each corresponding one of the ranges or values for the job definition elements to determine whether or not each of the desired results has a corresponding potential result.

If no corresponding potential result can be established in the comparison steps of the methodology, then the application queries the print processing system to determine whether or not an alternative peripheral device, with a matching value or range, is a component of the system. If an alternative peripheral device is a component of the system, then the application performs a comparison of the non-corresponding potential result with the matching value for the alternative peripheral; and, if no peripheral device is a component of the system, then the application will select a default peripheral device. The print stream will then be directed to the selected device for processing. The optimal peripheral devices might include: a printer; a second memory; a data processing application for further applying the application output stream; an envelope printer for printing address data on one or more envelopes; a document printer for printing one or more pages; a collator for collating a plurality of pages printed by the document printer; and/or, an inserter for inserting the one or more printed pages into a corresponding envelope.

Based upon print stream characteristics, the print processing application will determine the optimal use of the system's peripheral devices for performing the job. Additionally, the application will determine one or more application output streams wherein each one of the one or more output streams is directed to a corresponding peripheral device. Once the print stream has been analyzed, and the use of peripheral devices determined, the application establishes a job ticket representative of the print job and the optimal use of the one or more corresponding peripheral devices. The job ticket is saved in a memory of the print processing system for current and/or later use. If the job is to be performed essentially simultaneously with the processing of the stream, then the system performs the print job as described in saved job ticket; and can produce one or more reports indicative of the job performance. The reports are printed on a printer operatively associated with the print processing system, or may be downloaded to a memory medium such as a diskette, tape, or hard disk, or to a communication link such as a modem, or to both a memory and a communications device.

The method is capable of performing other tasks as derived from a legacy application which contributes a set of print data to the print processing system. The print processing system applies the set of print data to a set of one or more pre-determined job processes which might include: postal sorting; address cleansing; and, bar coding.

BRIEF DESCRIPTION OF THE DRAWINGS

FIG. 2 is a block diagram of a data processing system which is representative of a system which could act as host to the invention's method.

DETAILED DESCRIPTION OF THE PREFERRED EMBODIMENTS

Figure 1A:
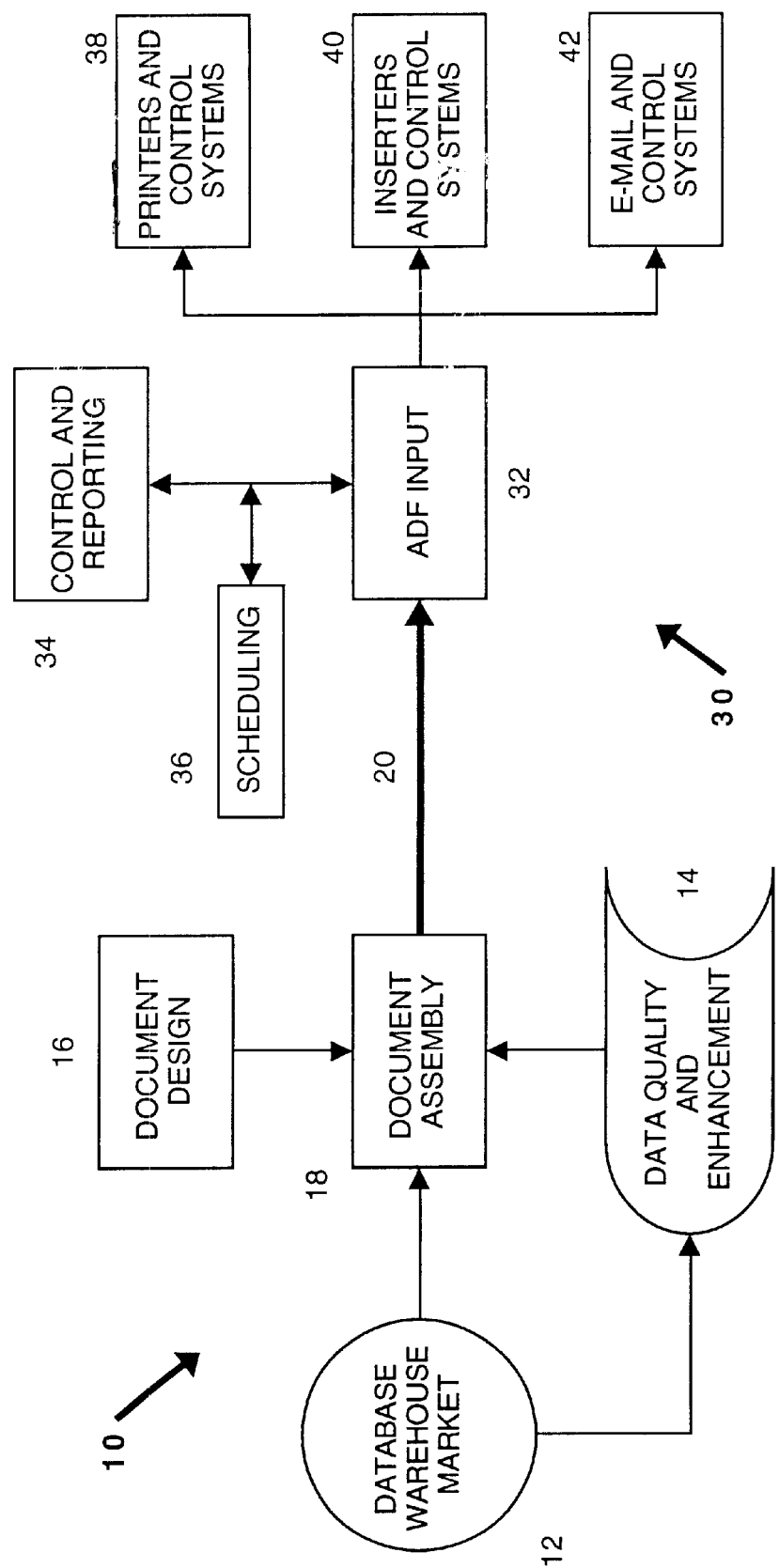
FIG. 1A is an upper level block diagram of a host system which is capable of supporting the method of the present invention.

FIG. 1A is an upper level block diagram of a host system which is capable of providing input to, and supporting, the method of the present invention while further providing output paths.

The system is divided into two subsystems; these are designated as document creation 10 and document manufacturer 30 which will also be referred to as the Automated Document Factory or ADF.

Document creation 10 includes a database warehouse market 12 which provides one or more data streams to be incorporated within the document assembly at document assembly station 18. The data streams are sourced from one or more databases contained within the database warehouse market 12 at the request of a document assembly routine within document assembly 18. The data may pass directly to document assembly 18 or may first pass through data quality and enhancement routine 14. Data quality and enhancement routine 14 processes data so as to prepare it for the requirements of the document assembly routine. If the document assembly routine does not require quality or enhancement processing, then the data would pass directly from the database warehouse market 12 to document assembly 18.

Document assembly 18 prepares a digital document and transmits the document to an ADF via a digital document transmission 20 known as a print stream. The ADF subsystem is shown in FIG. 1A as document manufacturer 30.

Document manufacturer 30 receives the digital document transmission 20 at the ADF input 32 and assigns a job ticket to the stream which is indicative of the print parameters associated with the print stream. ADF input 32 will re-direct the stream in accordance with the job ticket to various peripheral devices for printing and/or various output paths for re-transmission or data storage. The peripheral devices and output paths include: printers and their associated control systems 38; inserters and their associated control systems 40; and, E-mail and transmission control systems 42. It should be noted that the current invention is not limited to the embodiment shown, but may include any print stream finishing device such as console print stream finishers, storage devices for re-transmission, or interim data quality and enhancement routines for processing the print stream.

As ADF input 32 processes and directs the print stream, it will constantly monitor the forces acting on the print stream through control and reporting routines 34; these routines will in turn interface with scheduling module 36 to promote efficiency in current or subsequent print stream processing.

Figure 1B:
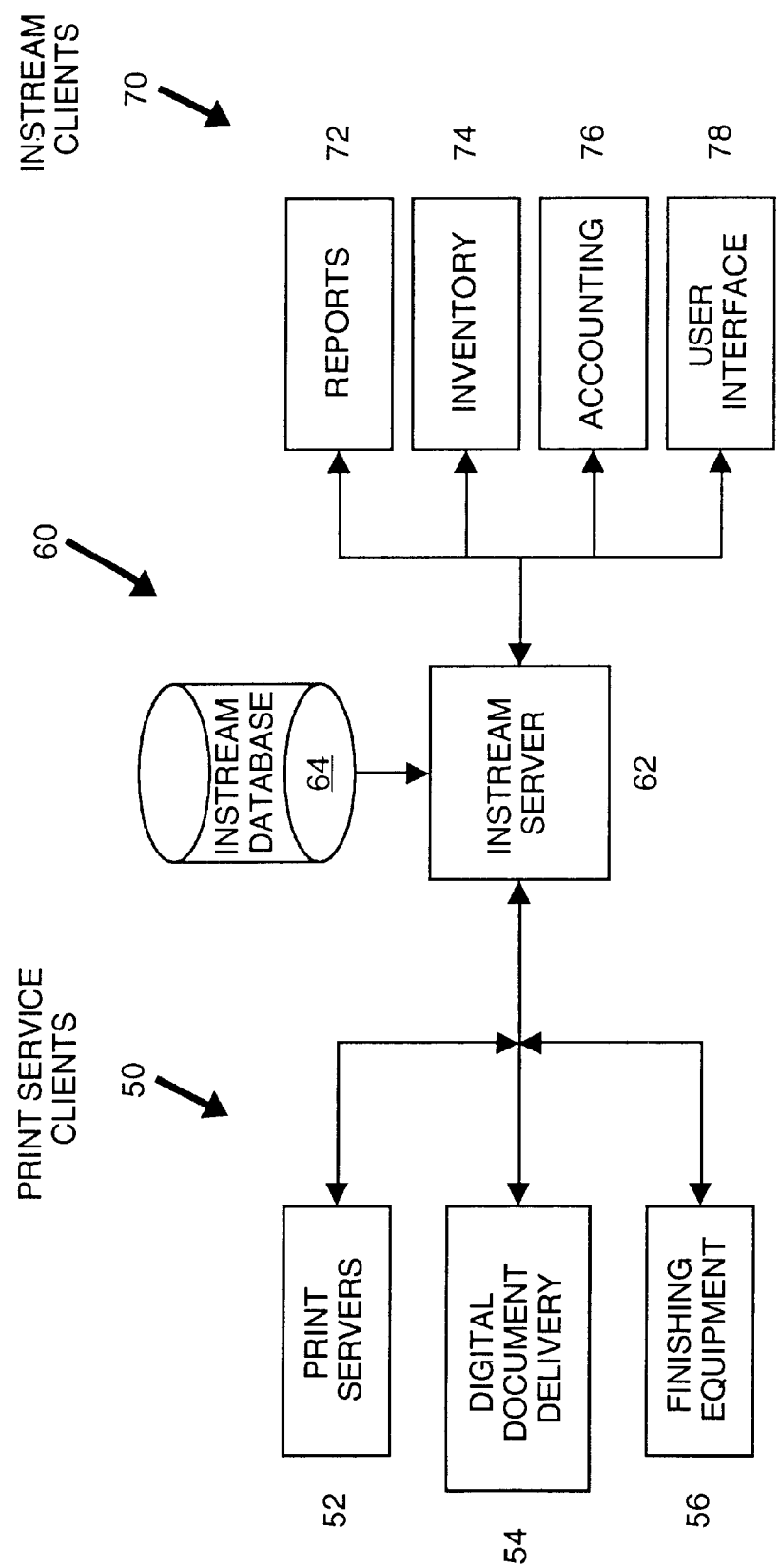
FIG. 1B is a block diagram of the system of the present invention and is shown as three (3) subsystems.

Turning to FIG. 1B there is shown a block diagram of the system of the present invention which is further broken down into three (3) subsystems designated as print service clients 50, InStream server system 60, and InStream clients 70.

Print service clients 50 is comprised of: print servers 52 which are receiving one or more print streams from InStream server 62 and reporting back statistical or process data which can be used by InStream clients 70 to manage the document creation process; digital document delivery systems 54 which enable high-volume mail producers to utilize existing legacy-generated print streams, and the images they contain, to further access internet billing and bill presentment applications; and, finishing equipment 56 for actually producing the document defined by the print stream.

Print service clients 50 communicate with InStream server system 60 via TCP/IP sockets. TCP/IP sockets are known to those skilled in the art and do not require further detail or explanation to fully appreciate and understand the present invention.

InStream server system 60 comprises InStream server 62 and InStream database 64. In one embodiment of the present invention, InStream server 62 is a multi-threaded, concurrent server running on the Win32™ platform (available from Microsoft Corporation of Redmond, Wash.). InStream server 62 is implemented in the Java™ programming language (available from Sun Microsystems, Inc. of Palo Alto, Calif.) and is therefore not necessarily restricted to the Win32 platform. Database access is provided via the Microsoft SQL™ server.

InStream clients 70 further comprises: reports 72 for producing print stream and finishing reports that can be used to monitor the system, determine optimal peripheral and system efficiencies or detail production; inventory 74 for monitoring system-wide capacity; accounting 76 for monitoring time and expense for sub-routines or document production activities; and, user interface 78 for monitoring of client activities.

Now turning to FIG. 2 there is shown a block diagram of a data processing system which is representative of a system which could act as host to the invention's method.

The ADF server is represented by data processing system 110 which is based on data processor 122. Data processor 122 is a central processing unit (CPU) of a computer (such as a personal computer (PC), a mid-frame (IBM AS/400), or main frame) and its associated RAM or other memory, operating system software, and application systems which are capable of performing basic print stream processing functions (such as SmartMailer® which is available from Pitney Bowes Inc. of Stamford, Conn.) or more advanced print stream processing (such as StreamWeaver® which is available from Pitney Bowes Inc. of Stamford, Conn.). The base components of the data processor 122 are known in the art and do not require a detailed description herein for an understanding of their utility and application.

Interoperatively connected to data processor 122 is the application program 124 which is the basis for the present application. Additionally, connected to data processor 122 are memory cells 132, 134, 136, and 138 which are utilized for saving various data streams being processed by the application program 124. The multiple memory means of the system may be located independently of each other, or may exist in co-located combinations. Varied memory means are contemplated wherein the memory may exist in the form of a PROM chip, PROM card, magnetic media, or other commercially available forms. The system layout, with respect to the memory, is at the convenience of the system designer. Further coupled to data processor 122, is printer 144 for document or print stream data output, monitor 142 which allows a system operator to view transactions occurring within the application program 24, and various input/output devices 146(a–n). Input and output devices 146(a–n), such as a keyboard for data input, or a modem for data transmission or reception can be interoperatively connected or interfaced to data processor 122 as appropriate.

Figure 3:
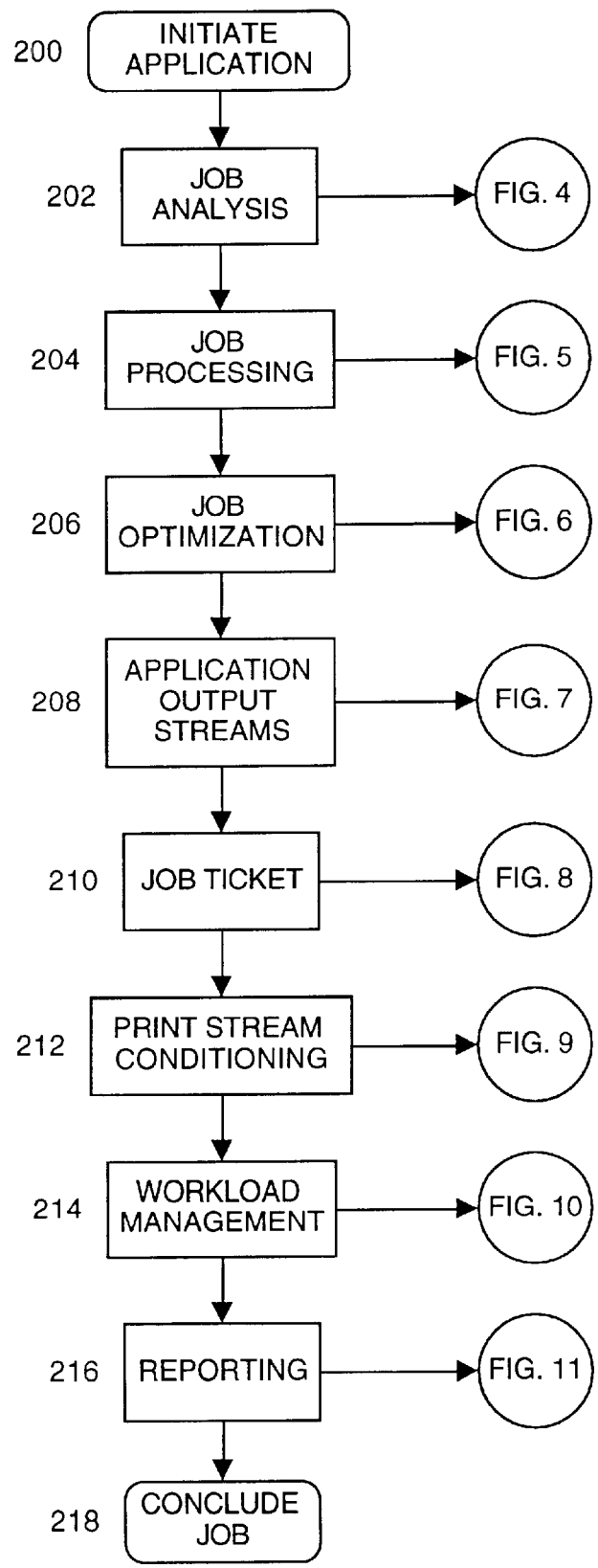
FIG. 3 is a upper level flowchart of the method of the present invention from print stream processing initiation to print job reporting.

The method of the present invention begins at FIG. 3 where there is shown an upper level flowchart of the flow of the present invention from print stream processing initiation to print job reporting. Each of the general method steps is shown with the legend of the Figure which more specifically describes that step.

The flow begins at step 200 where the print stream processing application is initiated. The application can be directed to document printing generally, or to a preferred embodiment of the present invention which is directed to the production of mailpieces. From step 200, the method advances to step 202 where job analysis is performed on the print stream introduced to the print stream processing application. Job analysis is the process of investigating incoming jobs and then determining if the attributes of the incoming job make it eligible for processing in the ADF environment. If the system determines that the incoming job is not eligible, then it can be re-routed to a more appropriate system or returned to its originator as not acceptable.

After the print stream has been analyzed at step 202, the method advances to step 204 where job processing is performed if selected and available from legacy applications providing the required process data. Job processes can include, but are not limited to: postal sorting; job splitting, finishing marks; spot coloring; address cleansing; bar coding; indexing; and, the insertion of custom marketing messages. From step 204, the system advances to step 206 where job optimization is performed by maintaining communications with other device controlling systems in the ADF environment. These systems provide device status and availability so that the InStream server can provide data for optimizing workflow decisions, thus ensuring that the best available device is utilized for the production phases.

The method advances from step 206 to step 208 where one or more output stream formats are selected by the system. The architecture of the present invention supports conversion of these output streams for routing to differing format equipment. The data stream transformations are not performed by the present invention but through callable conversion routines accessed by the InStream server.

Occurring essentially simultaneously with steps 202 through 208 is the creation of a job ticket at step 210. The job ticket is a collection of parameters, attributes and processes required for the successful production of a document such as a mailpiece. After creation of the job ticket, the method advances to step 212 where the print output stream can be conditioned prior to actual transmission to its designated finishing stations. Conditioning is further described in FIG. 9. The method then advances to step 214 where workload management is performed as based upon up-to-the-minute data received by the InStream database with respect to: job parameters; job status; available devices; and, device status.

A further aspect of workload management can be performed by the method advancing to step 216. At step 216, the InStream server provides operational management (the System user) with reports detailing job activity and productivity levels, device history information, and job performance history information. The method advances from step 216 to step 218 where the print stream job is completed.

Figure 4:
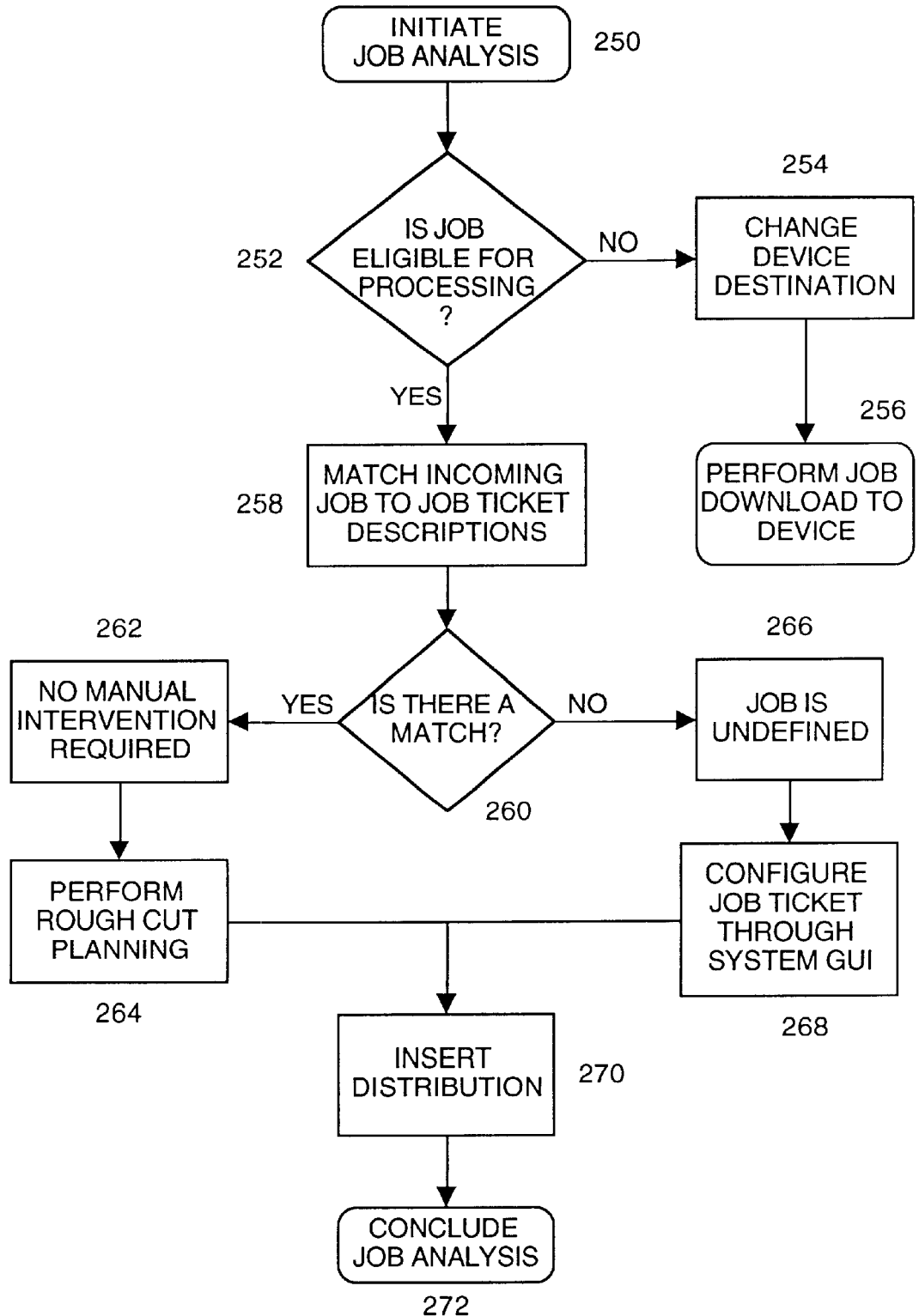
FIG. 4 is a detailed flowchart of the method of job analysis performed by the print stream processing application.

In FIG. 4, the specific steps of print stream job analysis as performed by the print stream processing application are shown in a detailed flowchart. The analysis begins at step 250 with initiation of the routine.

The method advances from initiation at step 250 to a query at step 252. At step 252, the method queries as to whether or not the job represented by the incoming print stream is eligible for processing within the ADF environment. If the response to the query is "NO," the method advances to step 254 where the device destination for the print stream is altered so as to re-route the print stream out of the ADF environment and directly to the device best suited for performing the print job. From step 254, the method proceeds to step 256 where the job is downloaded to the appropriate alternative device. If, however, the response to the query at step 252 is "YES," then the method advances to step 258 where the incoming job is matched to job ticket descriptions already on file in the InStream database.

The method advances from step 258 to a query at step 260 which asks if a match was determined at step 258. If the response is "NO," then the method advances to step 266 where the unmatched job is labeled as undefined. The method then advances to step 268 where the InStream server allows the system operator to configure a new job ticket through the system's graphical user interface (GUI). The method then advances to step 270. If the response to the query at step 260 is "YES," however, then the method advances to step 262 where it is determined that no manual intervention is required. From step 262, the method advances to step 264 where rough cut planning is performed by the systems operator based upon print stream analysis or device utilization; the method then advances to step 270.

At step 270, the InStream server will sort through the data stream and determine the quantities that are needed for inserts in a job run; additionally, demographic information regarding the distribution of inserts can be derived. The method then advances to step 272 where the job analysis routine is concluded.

Figure 5:
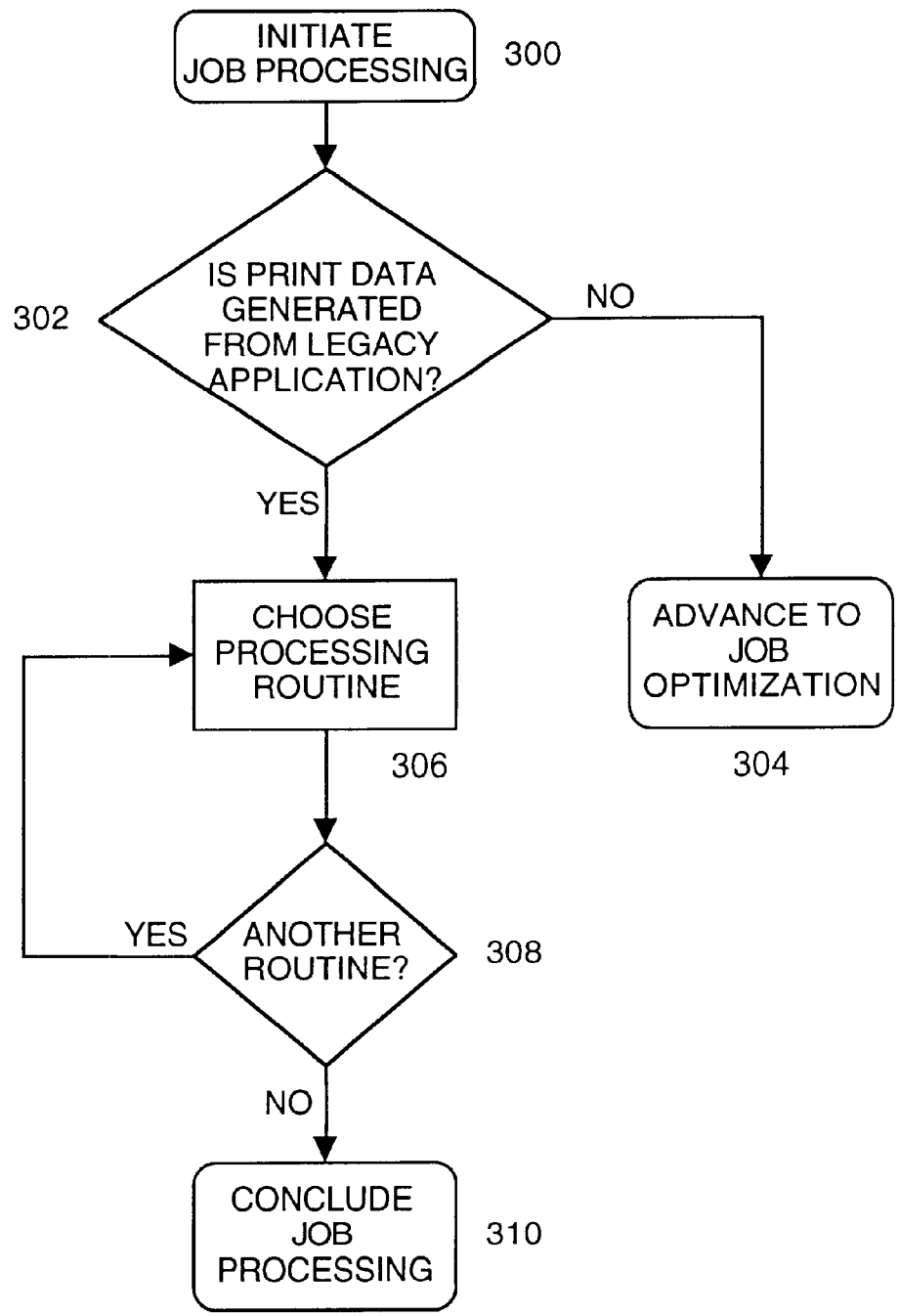
FIG. 5 is a detailed flowchart of the method of job processing selection which can be performed by the print stream processing application.

FIG. 5 is a detailed flowchart of the method of job processing selection which can be performed by the print stream processing application. The job processing selection begins at step 300 with the initiation of the job processing routine.

The method advances from step 300 to a query at step 302. At step 302, the method queries as to whether or not print data, for use by the InStream server, has been generated from a legacy application. If the response to the query is "NO," then the method advances, at step 304, directly to job optimization as is described in detail in FIG. 6. However, if the response to the query at step 302 is "YES," then the method advances to step 306 where a processing routine is selected from among whatever routines have been made available to the system. These routines can include, but are not limited to: postal sorting; job splitting, finishing marks; spot coloring; address cleansing; bar coding; indexing; and, the insertion of custom marketing messages.

After a routine has been selected at step 306, the method queries, at step 308, as to whether or not another routine is to be selected and applied. If the response to the query is "YES," then the method returns to step 306 for the selection of a subsequent routine; however, if the response to the query at step 308 is "NO," then the job processing routine advances to step 310 and concludes.

Figure 6:
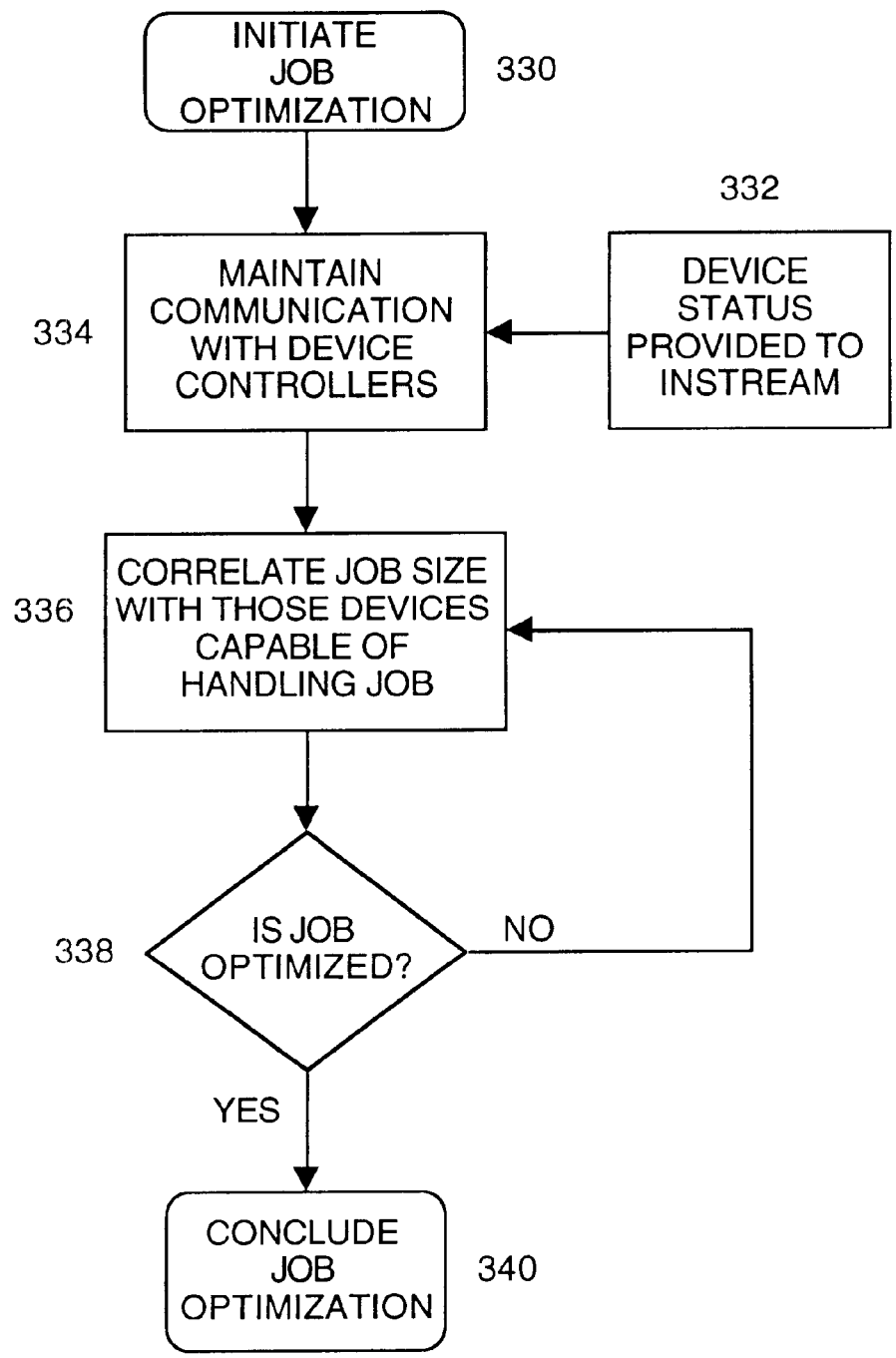
FIG. 6 is a detailed flowchart of the method of job optimization which can be performed by the print stream processing application.

Turning to FIG. 6, there is shown a detailed flowchart of the method of job optimization which can be performed by the print stream processing application. The job optimization process begins at step 330 with the initiation of the job processing routine before advancing to step 334.

Subsequent to step 330, the device status of the system devices and peripherals is provided to the InStream server before advancing to step 334. At step 334, the method maintains a communication link with all the system's device controllers before advancing to step 336 where the size of the print job is correlated with those devices whose status is known to the system to determine which devices are best able to provide their capabilities in the most efficient manner. After correlating the job parameters with the job devices, the method advances to the query at step 338.

At step 338, the method queries as to whether or not the job is optimized. If the response to the query is "NO," then the method returns to step 336 to check device status and re-run the job correlation. If, however, the response to the query is "YES," then the method advances to step 340 and concludes the job optimization routine.

Figure 7:
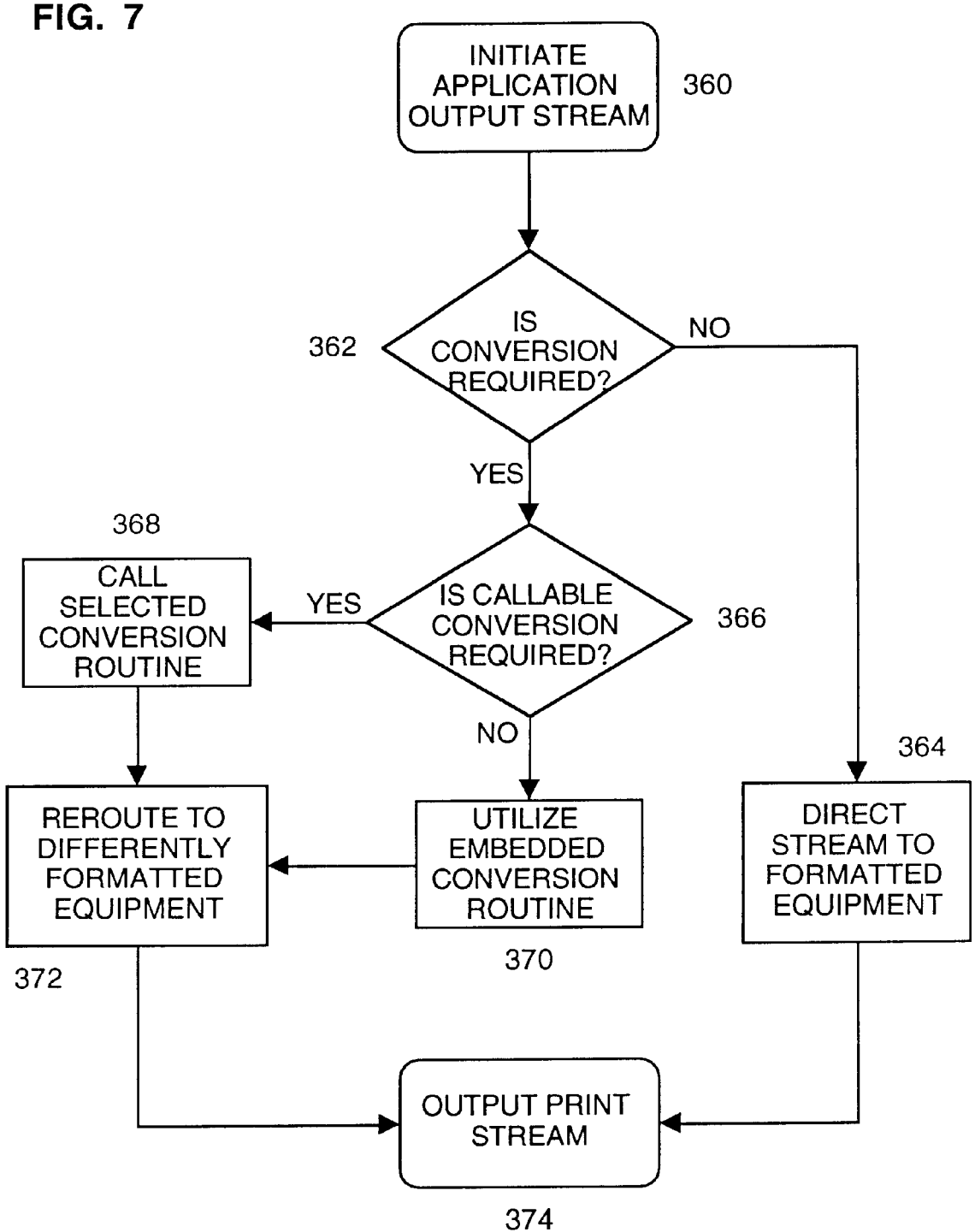
FIG. 7 is a detailed flowchart of the method of producing application output streams which can be performed by the print stream processing application.

Turning to FIG. 7, there is shown a detailed flowchart of the method of producing application output streams which can be performed by the print stream processing application.

The method begins at step 360 with the initiation of the application output stream routine. As the devices and peripherals that perform the printing job may have varied stream requirements, the InStream server utilizes the output streams routine to reformat the print stream as required. The method advances from initiation at step 360 to a query at step 362.

At step 362, the method queries as to whether or not conversion of the print stream is required. If the response to the query is "NO," then the method advances directly to step 364 where the print stream is directed to the equipment for which it is formatted. The method then advances from step 364 to step 374 where the print stream is output to the appropriate device before concluding the routine. However, if the response to the query at step 362 is "YES," then the method advances to a query at step 366 which asks if a callable conversion is required. A callable conversion is one that the InStream server can not make based upon its own resident routines but must call from data sources outside of the server. If the response to the query at step 366 is "NO," then the method advances to step 370 where an embedded conversion routine is called from within the InStream server before the method advances to step 372. If the response to the query at step 366 is "YES," however, then the method advances instead to step 368 where the selected callable conversion routine is actually called upon to perform the conversion before the method advances to step 372.

At step 372, the converted print stream is re-routed away from the ADF environment to the differently formatted equipment before the routine advances to step 374 where the print stream is output to the appropriate device before concluding the routine.

Figure 8:
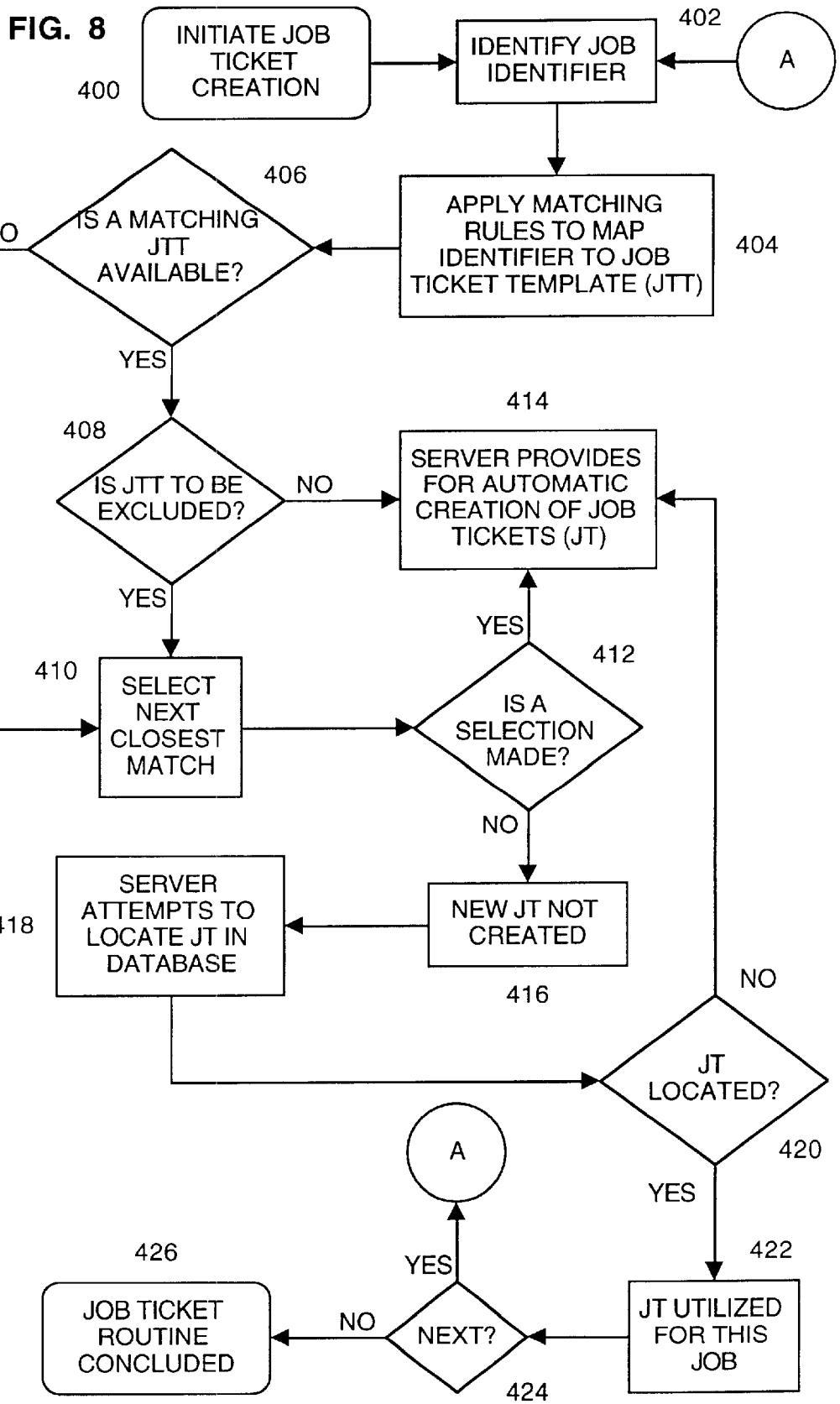
FIG. 8 is an upper level flowchart of the method of assembling a job ticket which can be performed by the print stream processing application.

Turning to FIG. 8, there is shown an upper level flowchart of the method of assembling a job ticket which can be performed by the print stream processing application. The InStream job ticket is a collection of parameters, attributes and processes required for the successful production of a document such as a mailpiece. Job tickets, initially are created manually by the systems operator and are specific to individual jobs or job groups. A job group is a collection of jobs with matching attributes. For example, a group of marketing jobs that all print on the same type of printer require the same type of form and must be finished on the same type of inserter can be grouped together to form a job group. A more detailed description of the job ticket and its creation is detailed in the co-pending application referenced hereinabove.

Job ticket creation is initiated at step 400 before advancing to step 402 where the job identifier is identified from the print stream data. Each message accompanying the print stream that an InStream client sends to the server contains a unique job identifier. Upon identifying the job identifier, the method advances to step 404 where the server applies matching rules to map the identifier to a job ticket template (JTT). Matching rules are established in the InStream database. Once the matching rules are applied, the method advances to a query at step 406.

Step 406 queries as to whether or not a matching JTT is available for the job identifier. If the response to the query is "NO," then the method advances to step 410 where the next closest match is determined as based upon the matching rules; otherwise, if the response is "YES," then the method advances to a query at step 408. The query at step 408 queries as to whether or not the JTT is to be excluded. The method allows for the exclusion of jobs from InStream server processing; thus, if the matching rules for a message identifier or range of identifiers indicate exclusion, then any associated JTTs are not run.

If the response to the query at step 408 is "YES," then the method advances to step 410 where the next closest match is determined as based upon the matching rules. From step 410, the method advances to a query at step 412 which asks if a template selection has been made. If the response is "YES," then the method advances to step 414 where the InStream server provides for the automatic creation of a new job ticket (JT). If the response to the query at step 408 is "NO," however, then the method advances directly to step 414.

Returning to the query at step 412, if the response to the query is "NO," then at step 416 a decision is made that a new job ticket will not created. From step 416, the method advances to step 418 where the InStream server attempts to locate an existing, matching job ticket in the database. The method then advances to step 420 where the method queries as to whether or not a job ticket was located in the database. If the response is "NO," then the method returns to step 414. However, if the response to the query at step 420 is "YES," then the InStream server will utilize, at step 422, the located, existing JT to run the current job.

When the JT has been utilized in step 422, the method will advance to step 424 and query as to whether or not there is a next job identifier to be identified. If the response to the query is "YES," then the method returns via path A to re-enter the method flow at step 402. If the response to the query at step 424 is "NO," however, then the method advances to step 426 and concludes the job ticket routine.

Figure 9:
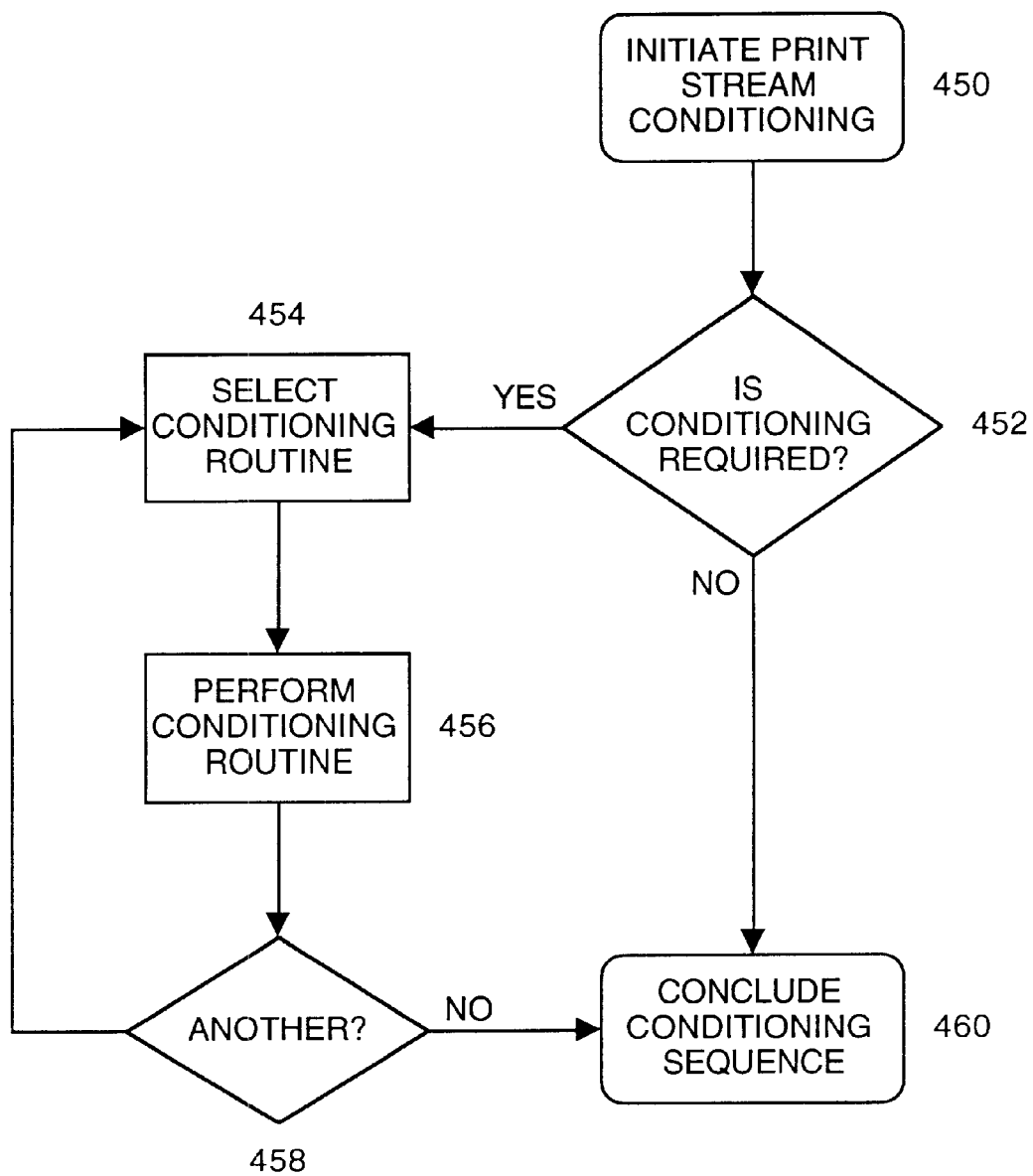
FIG. 9 is a detailed flowchart of the method of print stream conditioning which can be performed by the print stream processing application.

Turning to FIG. 9, there is shown a detailed flowchart of the method of print stream conditioning which can be performed by the print stream processing application.

The print stream conditioning routine is initiated at step 450 before advancing to a query at step 452 which asks if conditioning is required. Conditioning can be required for application to the print stream output for a number of reasons. These might include, but are not limited to the following: transformation—where a print stream needs to be converted from one print format to another; finishing support—where print streams may have barcodes or OMR marks added to support a particular finishing machine or postal requirement; or, cleansing—where the print stream is run through a postal or other cleansing process.

If the response to the query at step 452 is "NO," then the method concludes the conditioning routine at step 460; however, if the response to the query is "YES," then the method selects the required conditioning routine at step 454, performs the conditioning routine at step 456, then advances to a query at step 458 which asks if another conditioning routine is to be performed. If the response to the query is "YES," then the method returns to step 454; otherwise, the method advances to step 460 and concludes the conditioning routine.

Figure 10:
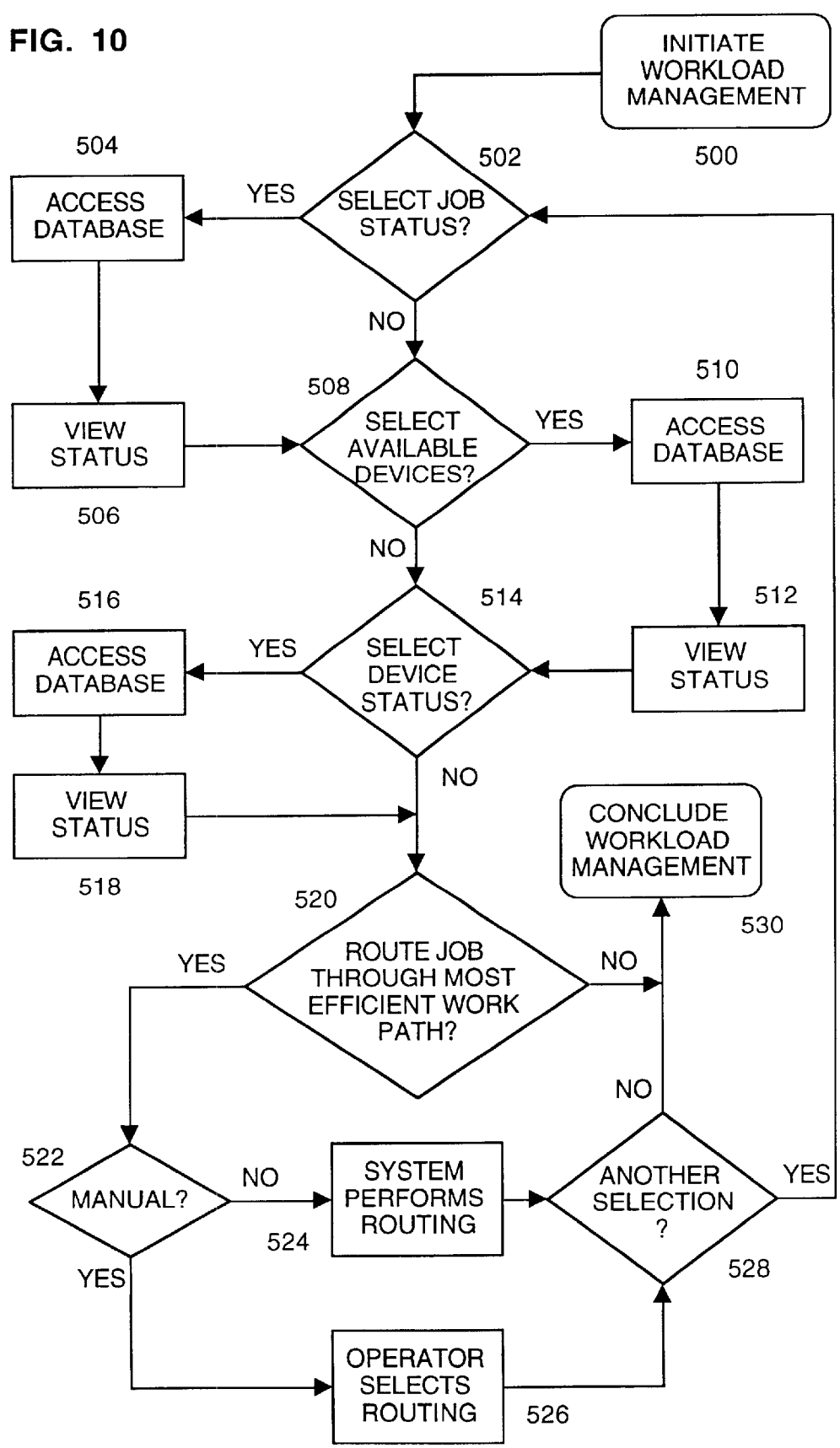
FIG. 10 is a detailed flowchart of the method of work load management which can be performed by the print stream processing application.

Turning to FIG. 10, there is shown a detailed flowchart of the method of work load management which can be performed by the print stream processing application.

The InStream database contains up to the minute information with respect to: job parameters; job status; available devices; and, device status. This information permits the system operator to effectively manage workload by performing systems analysis and/or automatically routing jobs through the most efficient work flow path.

Workflow management is initiated at step 500 before proceeding to a query at step 502. At step 502 the system asks whether or not the systems operator wishes to check on the status of a particular job. If the response is "NO," then the method advances to the query at step 508. If, however, the response to the query at step 502 is "YES," then the method accesses the InStream database at step 504 and allows the system user to view, at step 506, the job status or, in the alternative allows the system user to print the job status to a peripheral printer. The method then advances from step 506 to the query at step 508.

At step 508, the method queries as to whether or not the system operator wishes to select available devices. If the response to the query is "NO," then the method advances to the query at step 514. If, however, the response to the query at step 508 is "YES," then the method accesses the InStream database at step 510 and allows the system user to view, at step 512 the available device status or, in the alternative allows the system user to print the available device status to a peripheral printer. The method then advances from step 512 to the query at step 514.

At step 514, the method queries as to whether or not the system operator wishes to select device so as to determine current status of a particular device. If the response to the query is "NO," then the method advances to the query at step 520. If, however, the response to the query at step 514 is "YES," then the method accesses the InStream database at step 516 and allows the system user to view, at step 518 the device status or, in the alternative allows the system user to print the device status to a peripheral printer. The method then advances from step 518 to the query at step 520.

At step 520, the method queries as to whether or not the system operator wishes to route a particular print job through the most efficient work path. If the response to the query is "NO," then the method advances to step 530 where the workload management routine is concluded. However, if the response to the query at step 520 is "YES," then the method advances to step 522 and queries as to whether or not a manual determination by the system operator, of the most efficient work load path, is required. If the response to the query is "NO," then the method advances to step 524 where the InStream server performs the routing in the most efficient manner. If the response to the query at step 522 is "YES," however, then the method advances to step 526 where the system operator selects the routing path. Both steps 524 and 526 advance to step 528.

At step 528, the method queries as to whether or not another selection is to be made by the system operator, if the response is "YES," then the method returns to reenter the method flow at step 502. If the response to the query is "NO," then the method advances to step 530 where the workload management routine is concluded.

Figure 11:
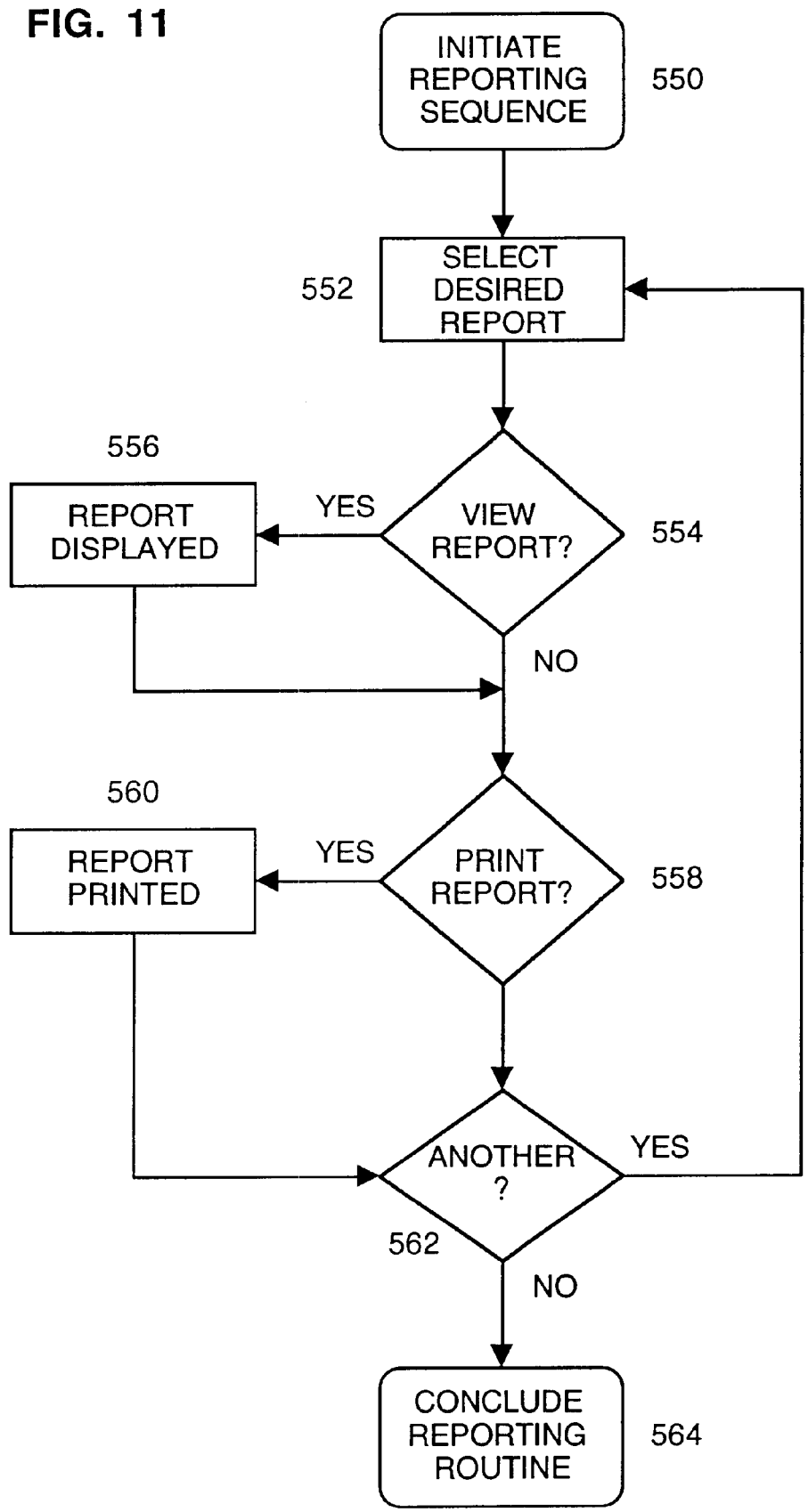
FIG. 11 is a detailed flowchart of the method of job and system reporting which can be performed by the print stream processing application.

The value of accurate reporting by the InStream server and associated database is demonstrated by the value to be derived from efficient workload management. Turning to FIG. 11, there is shown a detailed flowchart of the method of job and system reporting which can be performed by the print stream processing application.

The reporting sequence is initiated at step 550. The method advances from step 550 to step 552 where the desired report is selected from among a menu of available reports. The method advances from step 552 to a query at step 554 where the system operator is asked whether or not a viewing of the report is required. If the response to the query is "YES," then the method advances to step 556 where the selected report can be viewed on a monitor before the method advances to the query at step 558. However, if the response to the query at step 554 is "NO," then the method advances directly to the query at step 558.

At step 558, the system operator is asked whether or not the report is to be printed. If the response to the query is "YES," then the method advances to step 560 where the selected report is printed on a peripheral printer before the method advances to the query at step 562. However, if the response to the query at step 558 is "NO," then the method advances directly to the query at step 562.

Step 562 queries as to whether or not another report is to be accessed. If the response to the query is "YES," then the method returns to step 552; otherwise, the method advances to step 564 where the reporting routine is concluded.

While certain embodiments have been described above in terms of the system within which the InStream server may reside, the invention is not limited to such a context. The system shown in FIGS. 1–3 are an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. For instance, the sequence of steps shown in FIG. 3 can be altered while still producing an effective and valid method sequence. The specification and drawings are, accordingly, to be regarded in an illustrative rather than a restrictive sense.

What is claimed is:

1. A method of print stream determination wherein said print stream is directed to a print processing application for determining a job to be performed by a print processing system, comprising the steps of:

(a) initiating said print processing application;
   (b) directing said print stream to said print processing application to determine said job from a first set of characteristics resident in said print stream;
   (c) determining, at said print processing application, optimal use of a set of one or more peripheral devices for performing said job;
   (d) determining, at said print processing application, one or more application output streams wherein each one of said one or more output streams is directed to a corresponding peripheral device comprising said set of one or more peripheral devices;
   (e) establishing a job ticket representative of said print job and said optimal use of said one or more corresponding peripheral devices;
   (f) saving said job ticket in a memory of said print processing system;
   (g) performing said print job in respect of said saved job ticket, wherein a set of print data is derived from a legacy application and said print processing system applies said set of print data to a set of one or more pre-determined job processes that comprises address cleansing; and
   (h) producing one or more reports indicative of said job performance.

2. The method of claim 1, wherein said job comprises a second set of characteristics; said second set of characteristics further comprising:

(a) routing instructions for routing said print stream to a corresponding peripheral device driver of a corresponding peripheral device;
   (b) job definition elements for defining characteristics of said job; and
   (c) device driver definition elements for defining characteristics and capabilities of each of said corresponding peripheral devices.

3. The method of claim 2, wherein said optimal use determination is made by comparing each of said job definition elements with each of said device driver definition elements.

4. The method of claim 3, wherein said comparison of said job definition elements with each of said device driver definition elements further comprises the steps of:

(a) determining a first range or a first value for each of said job definition elements wherein said first range or said first value is representative of a desired result;
   (b) determining a second range or a second value for each of said device driver definition elements wherein said second range or said second value is representative of a potential result; and (c) comparing each of said second range s or said second values to each corresponding one of said first ranges or said first values to determine whether or not each of said desired results has a corresponding potential result; and, (i) if there is no corresponding potential result, then querying said print processing system to determine whether or not an alternative peripheral device, with a matching value or range, is a component of said system; and, (ii) if said alternative peripheral device is a component of said system, then comparing said non-corresponding potential result with said matching value for said alternative peripheral; and (iii) if no peripheral device is a component of said system, then selecting a default peripheral device.

5. The method of claim 4, wherein said comparison of said job definition elements with each of said device driver definition elements further comprises the steps of:

(a) determining a corresponding optimal peripheral device for performing each of said desired results; and (b) directing said print stream to said corresponding optimal peripheral device.

6. The method of claim 5, wherein said corresponding optimal peripheral device is a printer.

7. The method of claim 5, wherein said corresponding optimal peripheral device is a second memory.

8. The method of claim 5, wherein said corresponding optimal peripheral device is a data processing application for further applying said application output stream.

9. The method of claim 1, wherein said one or more reports are printed on a printer operatively associated with said print processing system.

10. The method of claim 1, wherein said set of one or more job processes comprises postal sorting.

11. The method of claim 1, wherein said set of one or more job processes comprises bar coding.

12. A system for print stream determination wherein said print stream is directed to a data processing application resident in said system for determining a job to be performed and analyzing said job, said system comprising:

(a) directing means for directing said print stream to said print processing application to determine said job from a first set of characteristics resident in said print stream;

(b) a set of one or more peripheral devices for performing said job, wherein said peripheral device is a mail processing system that comprises:
    i. an envelope printer for printing address data on one or more envelopes;
    ii. a document printer for printing one or more pages;
    iii. a collator for collating a plurality of pages printed by said document printer; and
    iv. an inserter for inserting said one or more printed pages into a corresponding envelope;

(c) first determining means for determining, at said print processing application, optimal use of said set of one or more peripheral devices;

(d) a set of one or more application output streams, determined at said print processing, wherein each one of said one or more output streams is directed to a corresponding peripheral device comprising said set of one or more peripheral devices (e) establishing means for establishing a job ticket representative of said print job and said optimal use of said one or more corresponding peripheral devices;

(f) a memory in said print processing system for saving said job ticket;

(g) initiation means for initiating said print job in respect of said saved job ticket; and (h) reporting means for producing one or more reports indicative of said job performance.

13. The system of claim 12, wherein said one or more reports are printed on a printer operatively associated with said print processing system.

14. The system of claim 13, wherein said corresponding optimal peripheral device is a printer.

15. The system of claim 13, wherein said corresponding optimal peripheral device is a data processing application for further applying said application output stream.

16. The system of claim 12, wherein said one or more envelopes and said plurality of pages are printed on a single printer.

17. A method of producing one or more mailpieces from a print stream under direction of a print processing application resident in a print processing system, the method comprising the steps of:

(a) initiating said print processing application;

(b) directing said print stream to said print processing application to determine a job based upon a first set of characteristics resident in said print stream and wherein said job includes characteristics defining said one or more mailpieces, wherein said job comprises a second set of characteristics; said second set of characteristics further comprising:
    i. routing instructions for routing said print stream to a corresponding peripheral device driver of a corresponding peripheral device;
    ii. job definition elements for defining characteristics of said job; and
    iii. device driver definition elements for defining characteristics and capabilities of each of said corresponding peripheral devices, wherein said optimal use determination is made by comparing each of said job definition elements with each of said device driver definition elements, wherein said set of one or more job processes comprises address cleansing;

(c) determining, at said print processing application, optimal use of a set of one or more peripheral devices for performing said job, wherein said set of one or more job processes comprises address cleansing;

(d) determining, at said print processing application, one or more application output streams wherein each one of said one or more output streams is directed to a corresponding peripheral device comprising said set of one or more peripheral devices, wherein said peripheral device is a printer;

(e) establishing a job ticket representative of said print job and said optimal use of said one or more corresponding peripheral devices;

(f) saving said job ticket in a memory of said print processing system;

(g) producing said one or more mailpieces by utilizing said one or more corresponding peripheral devices as defined by said job ticket; and (h) producing one or more reports indicative of said job.

18. The method of claim 17, wherein said job definition elements define mailpiece characteristics.

19. The method of claim 18, wherein said mailpiece characteristics further comprise:

(a) at least one set of address data; and (b) barcode data in respect of said address data.

20. The method of claim 17, wherein said comparison of said job definition elements with each of said device driver definition elements further comprises the steps of:

(a) determining a first range or a first value for each of said job definition elements wherein said first range or said first value is representative of a desired result;

(b) determining a second range or a second value for each of said device driver definition elements wherein said second range or said second value is representative of a potential result; and (c) comparing each of said second ranges or said second values to each corresponding one of said first ranges or said first values to determine whether or not each of said desired results has a corresponding potential result; and, (i) if there is no corresponding potential result, then querying said print processing system to determine whether or not an alternative peripheral device, with a matching value or range, is a component of said system; and, (ii) if said alternative peripheral device is a component of said system, then comparing said non-corresponding potential result with said matching value for said alternative peripheral; and (iii) if no peripheral device is a component of said system, then selecting a default peripheral device.

21. The method of claim 20, wherein said comparison of said job definition elements with each of said device driver definition elements further comprises the steps of:

(a) determining a corresponding optimal peripheral device for performing each of said desired results; and (b) directing said print stream to said corresponding optimal peripheral device.

22. The method of claim 21 wherein said corresponding optimal peripheral device is a second memory.

23. The method of claim 17, wherein said one or more reports are printed on a printer operatively associated with said print processing system.

24. The method of claim 17, wherein a set of print data is derived from a legacy application and said print processing system applies said set of print data to a set of one or more pre-determined job processes.

25. The method of claim 24, wherein said set of one or more job processes comprise postal sorting.

26. The method of claim 24, wherein said set of one or more job processes comprises bar coding.

27. The method of claim 17, wherein said corresponding optimal peripheral device is a data processing application for further applying said application output stream.

* * * * *